United States Patent [19]

Ochiai et al.

[11] Patent Number: 4,874,202
[45] Date of Patent: Oct. 17, 1989

[54] SLIDING TYPE SUNROOF LIFT DOWN DEVICE

[75] Inventors: Hironori Ochiai, Nagoya; Etsuo Suzuki, Miura; Kazuo Ikuta, Hiratsuka, all of Japan

[73] Assignees: Aisin Seiki Kabushiki Kaisha, Aichi; Kanto Jidosha Kogyo Kabushiki Kaisha, Kanagawa, both of Japan

[21] Appl. No.: 187,243

[22] Filed: Apr. 28, 1988

[30] Foreign Application Priority Data

Apr. 30, 1987 [JP] Japan .................. 62-107541

[51] Int. Cl.$^4$ ............................................... B60J 7/10
[52] U.S. Cl. ................................................. 296/222
[58] Field of Search ............ 296/216, 217, 218, 219, 296/220, 221, 222

[56] References Cited

U.S. PATENT DOCUMENTS 3,005,226 10/1961 Werner .
3,290,087 12/1966 Werner .
4,210,359 7/1980 Mori ..................... 296/222
4,688,848 8/1987 Niwa ..................... 296/226
4,707,022 11/1987 Roos et al. ............. 296/222

FOREIGN PATENT DOCUMENTS 2011421 9/1971 Fed. Rep. of Germany ...... 296/222
4419 1/1985 Japan ..................... 296/222

Primary Examiner—Sherman D. Basinger
Assistant Examiner—Stephen P. Avila
Attorney, Agent, or Firm—Finnegan, Henderson, Farabow, Garrett & Dunner

[57] ABSTRACT

A sliding type sunroof has a pair of rails, a front shoe slidably retained in each rail, and a sunroof panel supported by the front shoe and slidable together with the front shoe for opening the roof of an automobile. A lift down device for the sunroof includes a bracket pivotally connected to the front shoe at a pivot point and having the sunroof panel secured thereto, the sunroof panel being lifted down and placed in a slidable state by turning the bracket about the pivot point.

3 Claims, 5 Drawing Sheets

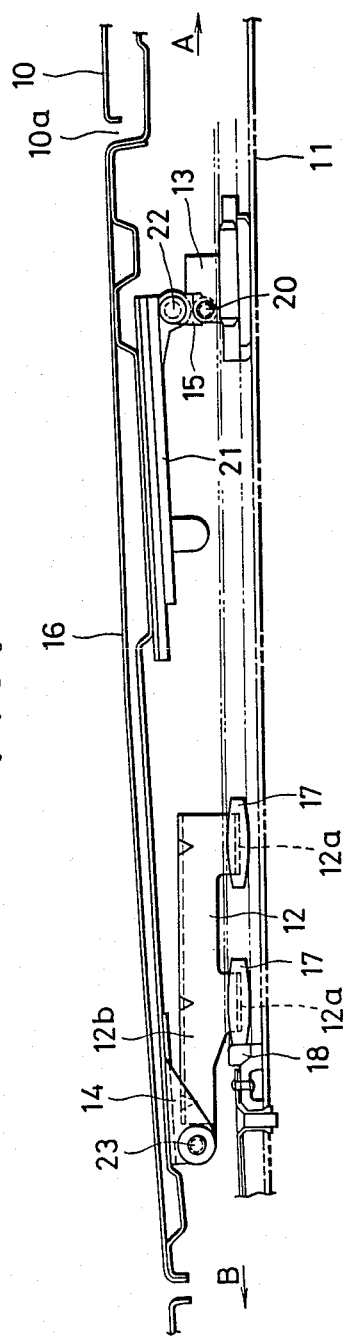
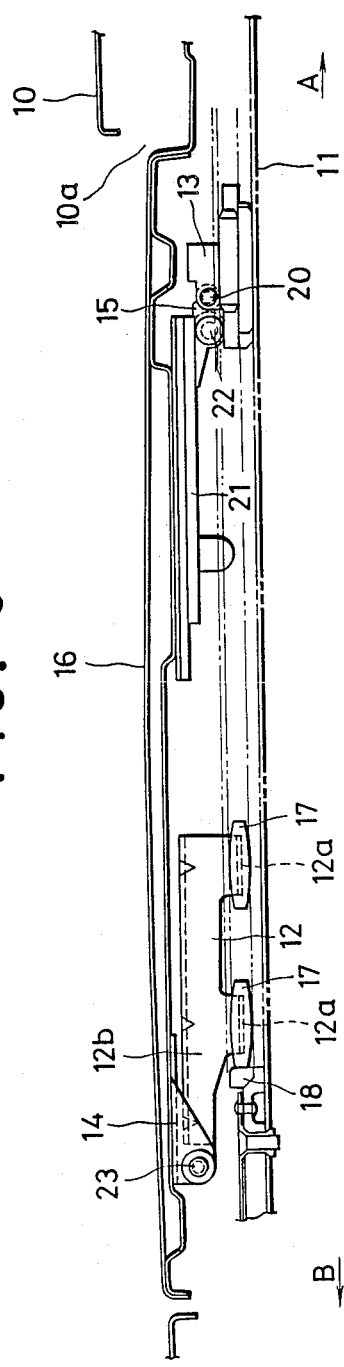

SLIDING TYPE SUNROOF LIFT DOWN DEVICE

FIELD OF THE INVENTION

This invention relates to a lift down device for a sliding type sunroof for automotive vehicles.

BACKGROUND OF THE INVENTION

As shown in FIGS. 6 and 7, the sliding type sunroof having a lift down device according to the prior art includes rails 1, a front shoe 3 and a rear shoe 4 slidably retained on each rail 1 via a shoe piece 2, and a sunroof panel 5 secured to the front shoe 3 via a bracket 6 and secured to the rear shoe 4 via a link 7. The link 7 is turned and the sunroof panel 5 is lifted down and placed in a slidable state by turning the front shoe 3 about the shoe piece 2. The sunroof panel 5 may then be slid in the rails 1 together with the front shoe 3 and rear shoe 4 to open a roof 8 of the vehicle.

While the amount by which the sunroof panel 5 is allowed to recede during the lift down operation is made large so as not to affect the sliding of the sunroof panel 5, it is also required that the sunroof be made as thin as possible in order to provide greater comfort in the passenger compartment by affording more head clearance. To this end, efforts have been made to maximize the distance between the link 7 and the pivot point of the sunroof panel 5 for lifting down the panel 5. However, when the abovementioned arrangement is adopted, the aforementioned distance cannot be made greater than the length of the rails 1 since the link 7 is turned and the sunroof panel 5 is lifted down by turning the front shoe 3 about the shoe piece 2. As a consequence, the sunroof cannot be made small in thickness while sufficiently increasing the amount by which the sunroof panel 5 recedes at lift down.

SUMMARY OF THE INVENTION

An object of the present invention is to overcome the problems and disadvantages of the prior art.

Accordingly, an object of the present invention is to provide a sunroof lift down device which allows the sunroof of an automotive vehicle to be made small in thickness while the amount by which the sunroof panel recedes at lift down is enlarged by lengthening the distance between link and the pivot point of the sunroof panel.

According to the present invention, the foregoing object is attained by providing a lift down device in a sliding type sunroof having a pair of rails, a front shoe slidably retained in each rail, and a sunroof panel supported by the front shoe and slidable together with the front shoe for opening a roof of an automobile. The lift down device includes a bracket pivotally connected to the front shoe at a pivot point and having the sunroof panel secured thereto. The sunroof panel is lifted down and placed in a slidable state by turning the bracket about the pivot point.

In operation, the sunroof panel is lifted down upon turning the bracket relative to the front shoe. As a result, the pivot point can be situated forwardly of the rails to lengthen the distance between the pivot point and the link. Consequently, the sunroof can be made small in thickness while the amount by which the sunroof panel recedes at lift down can be enlarged.

Thus, because the bracket is pivotally connected to the front shoe and the sunroof panel is secured thereto, the pivot point of the sunroof panel can be situated forwardly of the rails so that the distance between the pivot point and the link can be increased. This makes it possible to reduce the thickness of the sunroof while at the same time enlarging the amount by which the sunroof panel recedes at lift down. As a result, more headroom can be provided in the passenger compartment for greater comfort without the sunroof panel and roof interfering with each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate several embodiments of the present invention and together with the description, serve to explain the principles of the present invention.

FIG. 4 is a sectional view of the sunroof of FIG. 1 showing a sunroof panel in an opened state;

FIG. 5 is a sectional view of the sunroof of FIG. 1 showing the sunroof panel in a lifted down state.

DESCRIPTION OF THE PREFERRED EMBODIMENT

Figure 1:
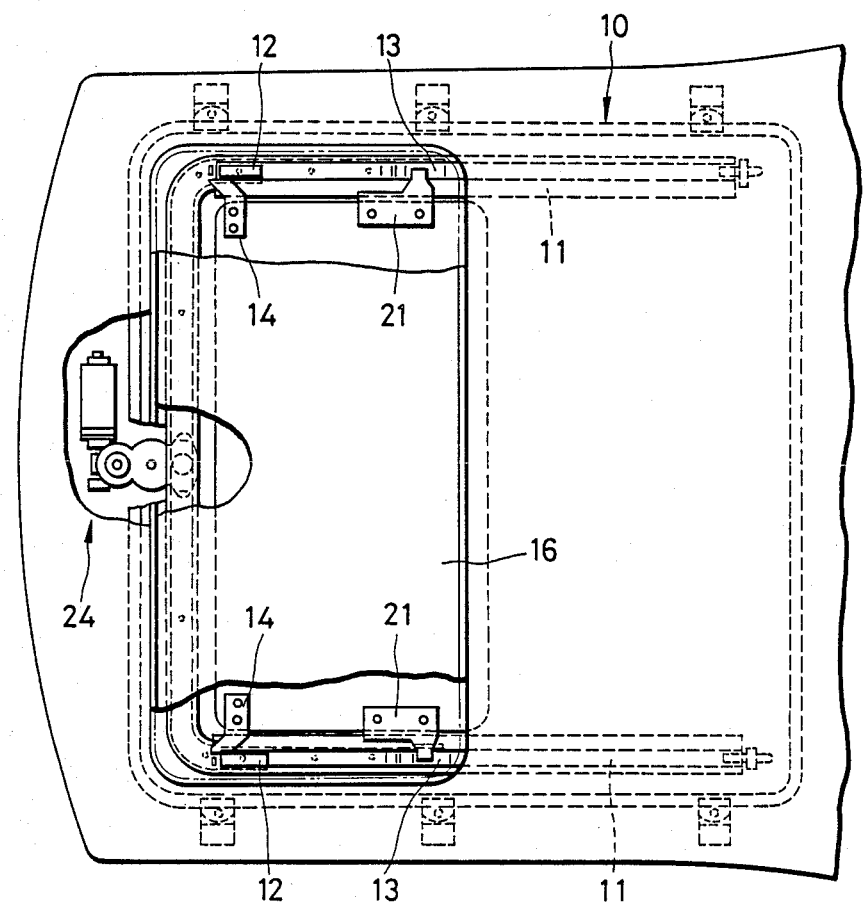
FIG. 1 is a plan view illustrating a sliding type sunroof according to the present invention.

A preferred embodiment of the present invention will now be described in detail with reference to FIGS. 1 through 5.

As shown in FIGS. 1 through 5, rails 11 are fixedly secured to a roof, each rail slidably retaining a front shoe 12 and a rear shoe 13. The sliding motion of the front shoe 12 and rear shoe 13 is limited by a stopper 18 provided in the rail 11 so that the shoes will not fall out of the rail. A sunroof panel 16 is held on the front shoe 12 via a bracket 14 and on the rear shoe 13 via a link 15 and a bracket 21 so as to be slidable together with the front shoe 12 and rear shoe 13.

As shown in FIGS. 4 and 5, the rear shoe 13 is slidably supported in the rail 11. One end of the link 15 is pivotally connected to the rear shoe 13 by a pin 20. The other end of the link 15 is pivotally connected by a pin 22 to the bracket 21, which is secured to the sunroof panel 16.

Figure 2:
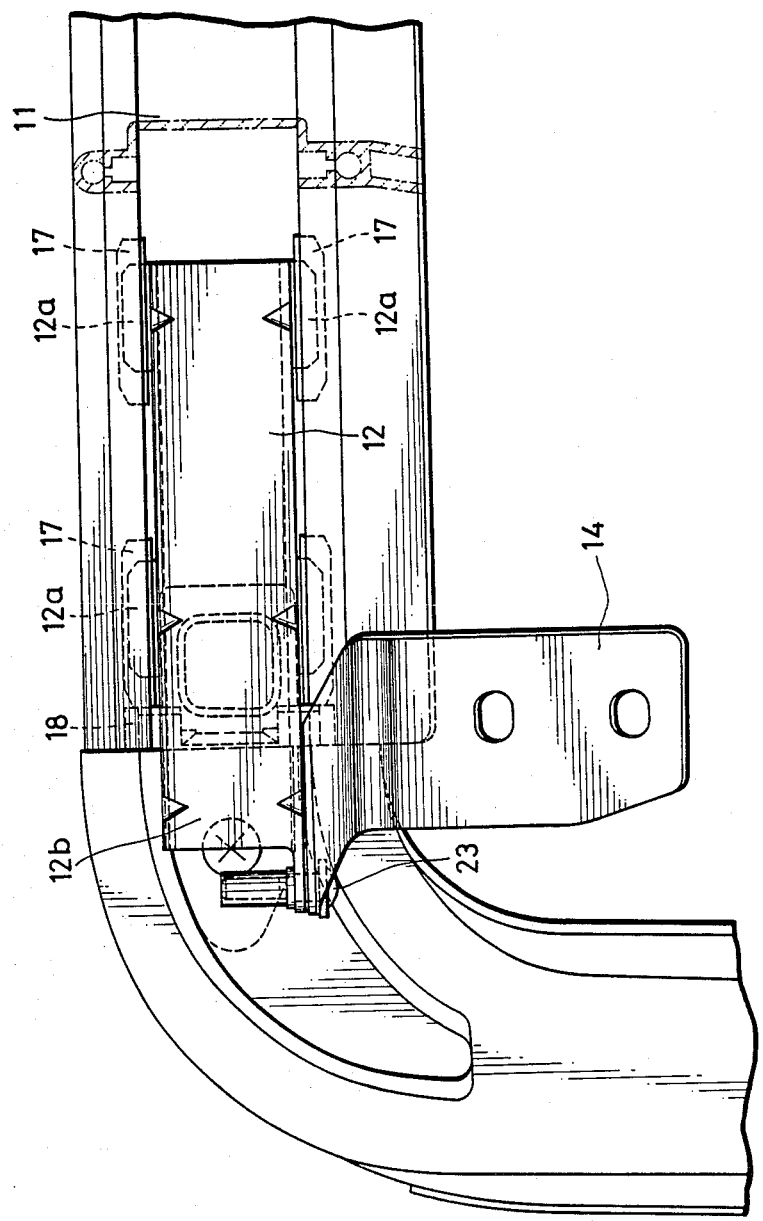
FIG. 2 is an enlarged view illustrating a portion A shown in FIG. 1.
Figure 3:
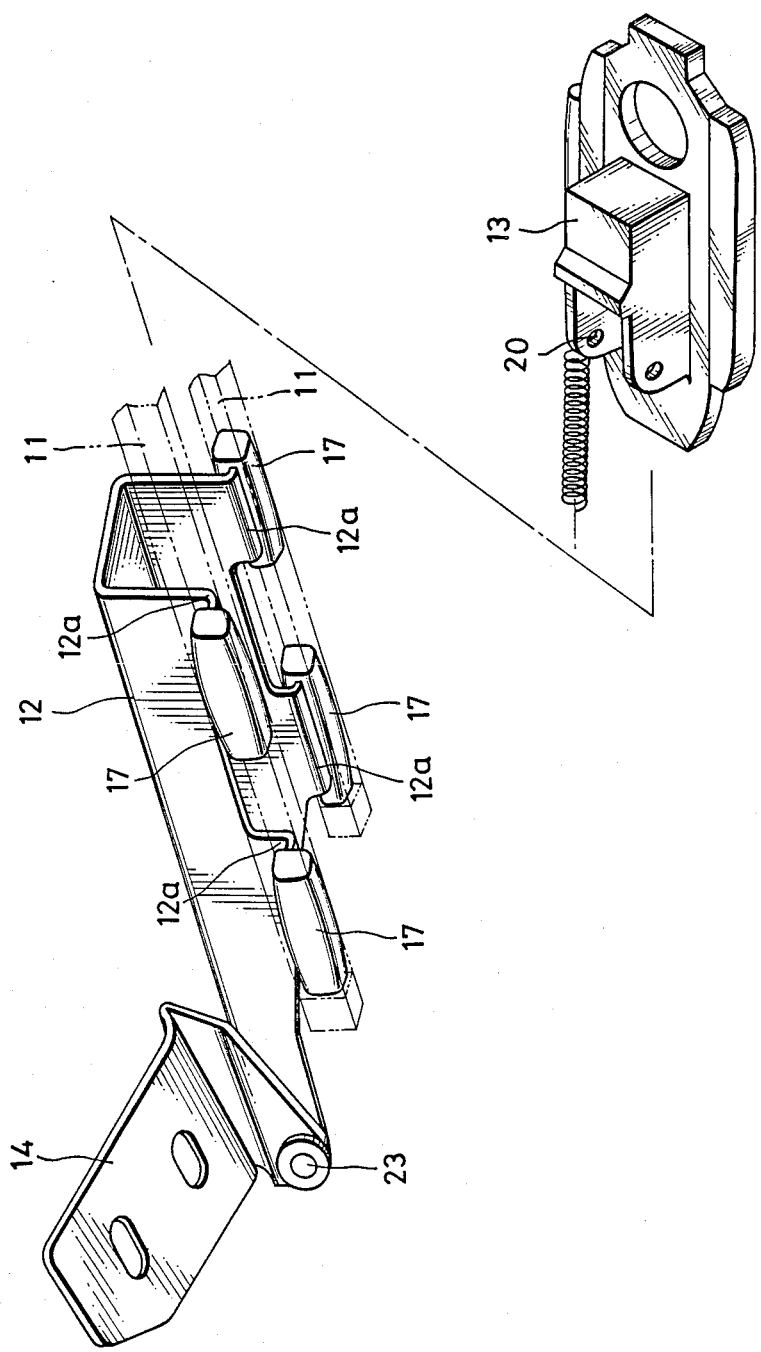
FIG. 3 is a perspective view of a lift down device according to the present invention.
Figure 6:
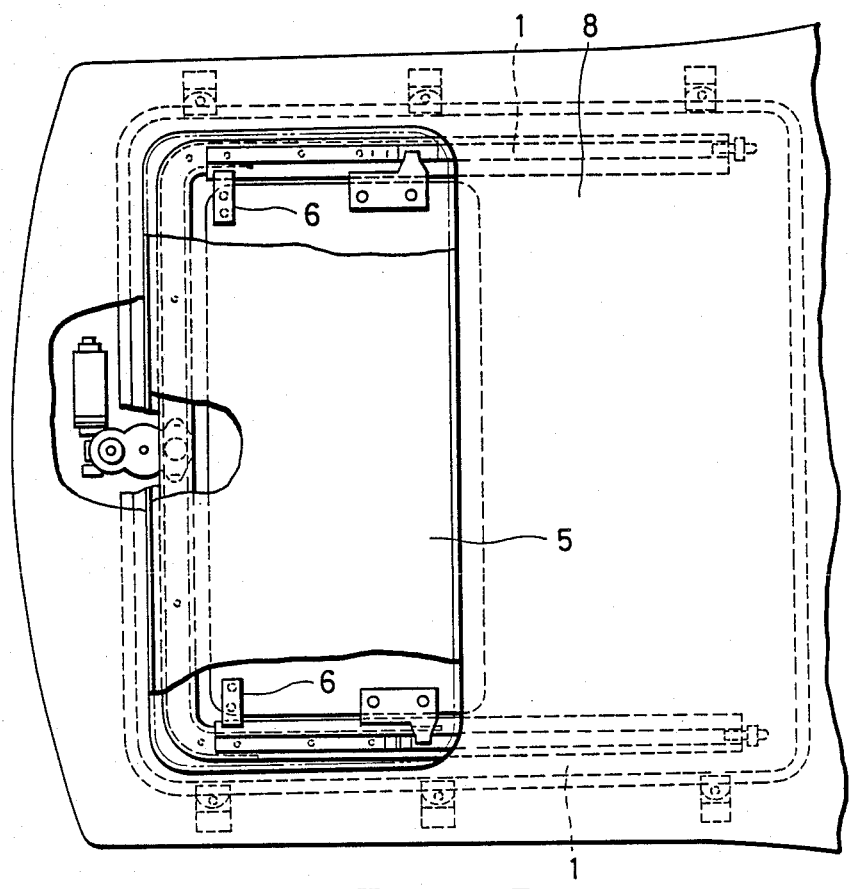
FIGS. 6 and 7 are views illustrating a sliding type sunroof according to the prior art.
Figure 7:
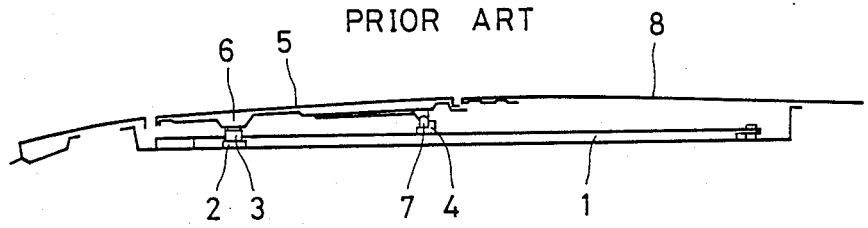

As illustrated in FIGS. 2 and 3, the front shoe 12 is provided with legs 12a to each of which a shoe piece 17 is secured. The shoe pieces 17 are retained within the rail so as to be slidable therealong. The front shoe 12 is also formed to have a projection 12b projecting forwardly (leftward in FIG. 4) from the leg 12a. The bracket 14 is pivotally connected to the projection 12b by a pin 23. The sunroof panel 16 is fixedly secured to the bracket 14.

The operation of the invention will now be described.

In FIG. 4, the sunroof panel 16 is shown to be flush with the roof 10 of the vehicle, in which state an aperture 10a in the roof is closed. When a drive unit 24 shown in FIG. 1 is operated in this state, the rear shoe 13 is pulled by a wire (not shown) and is slid in the direction of arrow A in FIG. 4. As a result of this sliding motion, the link 15 is turns counter-clockwise in FIG. 4 about the pin 20. Accordingly, the sunroof panel 16 turns clockwise in FIG. 4 together with the bracket 14 about the pin 23 and is placed in a slidable state shown in FIG. 5. When the rear shoe 13 is slid further in direction A under these conditions, the sunroof panel 16, along with the front shoe 12 and rear shoe 13, is slid in the direction A in FIG. 5, thereby opening the aperture 10a in roof 10. If the rear shoe 13 is then slid in the direction of arrow B in FIG. 5, the sunroof panel 16, along with the front shoe 12 and rear shoe 13, slides in the direction B until the front shoe 12 abuts against the stopper 18, i.e., until the sunroof panel 16 assumes the position shown in FIG. 5. When the sunroof panel 16 arrives at this position, the link 15 turns clockwise in FIG. 5 about the pin 20. As a result, the sunroof panel 16 turns clockwise in FIG. 5 about the pin 23 and closes the aperture 10a, as shown in FIG. 4.

Since the sunroof panel 16 is thus lifted down owing to the turning of bracket 14 about the pin 23, the point about which the sunroof panel 16 turns can be situated further forward than in the prior art. As a result, the sunroof panel 16 can be caused to recede a sufficient amount, even though the link 15 is shortened. Moreover, shortening the link 15 makes it possible to reduce the thickness of the sunroof and provide more headroom, thereby making the passenger compartment more comfortable.

As many apparently widely different embodiments of the present invention can be made without departing from the spirit and scope thereof, it is to be understood that the invention is not limited to the specific embodiments thereof except as defined in the appended claims.

What is claimed is:

1. A sliding type sunroof for a vehicle, comprising:
   a pair of rails;
   a pair of front shoes, each of said front shoes being slidably retained in a corresponding one of said pair of rails;
   a sunroof panel operatively connected to said pair of front shoes and selectively positioned between a closed position and an open position, said open position being defined by a gap extending inwardly along an exterior of the vehicle, said sunroof panel being supported by said front shoe and being slidable together with said front shoe between said open and said closed position; and
   a lift down device including a bracket pivotally connected to said front shoe at a pivot point, said sunroof panel being secured to said lift down device at said pivot point, said bracket being rotatable about said pivot point to slide said front shoe and thereby space said sunroof panel inwardly relative to the exterior of the vehicle in said open position, said liftdown device including a rear bracket and a rotatable link, said rotatable link being pivotally connected to a rear shoe slidably retained in each of said rails, said rotatable link being rotated by slidable movement of said sunroof panel, each of said rails having a front edge disposed beneath said corresponding one of said front shoes, said pivot point of said front bracket extending beyond said front edge of each of said rails.

2. The sliding type sunroof according to claim 1, wherein said front shoe includes a pair of shoe pieces slidably disposed in each of said rails.

3. The sliding type sunroof according to claim 2, wherein an electric cable from a drive unit is connected to said each rear shoe for forward and rearward movement of said sunroof panel.

* * * * *